CHARLES C. BOOKOUT
PAUL E. TAYLOR
INVENTORS

April 16, 1963

C. C. BOOKOUT ETAL 3,085,645

POWER STEERING SYSTEM

Filed July 15, 1959

CHARLES C. BOOKOUT
PAUL E. TAYLOR
INVENTORS

BY John R. Faulkner
Thomas H. Oster

ATTORNEYS

CHARLES C. BOOKOUT
PAUL E. TAYLOR
INVENTORS

BY John R. Faulkner
Thomas H. Oster

ATTORNEY

United States Patent Office 3,085,645
Patented Apr. 16, 1963

3,085,645
POWER STEERING SYSTEM
Charles C. Bookout and Paul E. Taylor, Livonia, Mich., assignors to Ford Motor Company, Dearborn, Mich., a corporation of Delaware
Filed July 15, 1959, Ser. No. 827,271
23 Claims. (Cl. 180—79.2)

This invention relates generally to power steering for motor vehicles, and more particularly to such a system in which the overall steering ratio is varied as a function of the speed of the vehicle.

In the early days of the passenger automobile, maximum speeds were relatively low, as were loadings on the dirigible wheels of the vehicle. Under these conditions it was possible to utilize a low overall steering ratio, that is, a low ratio of steering wheel turns to dirigible wheel turns. As wheel loadings increased as a result of the increasing size and weight of motor vehicles, it was found necessary to increase the overall steering ratio in order to keep the manual steering effort within reasonable limits. By about 1950 steering ratios had been pushed so high that car handling qualities had been sacrificed to the point where it was impractical to increase steering ratios any further. Since wheel loadings were continuing to increase, power steering gained rapid acceptance as an alternative to still further increasing steering ratios.

The first power steering gears did not fully realize their potentialities since they were primarily a power servo coupled into an otherwise conventional steering system still having an undesirably high overall steering ratio. The next step in the evolution of power steering was to reduce the steering ratio to a lower and more desirable level. Here an obstacle was encountered, in that if the ratio was made as low as would be desirable for about-town driving and parking, the steering became highly critical and tended toward instability at highway speeds.

The prior art has approached this problem by suggesting variable ratio power steering, in which the overall steering ratio in the straight-ahead position of the vehicle wheels is high and is progressively reduced as the dirigible wheels of the vehicle are turned away from the straight-ahead position. Since at highway speeds the dirigible wheels of the vehicle seldom depart more than a few degrees from the straight-ahead position the result is to provide a high steering ratio for highway use. In turning corners and parking, advantage is taken of the low steering ratio which becomes effective as the dirigible wheels depart substantially from the straight-ahead position. This variable ratio power steering is a way of approaching, but only approaching, the ideal. What is necessary to attain the theoretically ideal power steering system is to vary the steering ratio infinitely from a desired low to a desired high as a function of vehicle speed.

It is an object of this invention to provide an improved power steering gear for motor vehicles.

More particularly, it is an object of this invention to provide an improved steering gear in which the overall steering ratio is varied as a function of the speed of the motor vehicle.

A further object of this invention is to provide such a steering gear which is simple, rugged, easy to maintain, and will have a long trouble-free service life.

Another object of this invention is to provide such a steering gear which utilizes proven mechanical and hydraulic components cooperating in a new way to provide an improved steering system, and which will "fail safe" in the event of loss of hydraulic pressure.

Further objects and advantages of the present invention will be apparent from the following description, reference being had to the accompanying drawing wherein a preferred form of the present invention is clearly shown.

Figure 1:
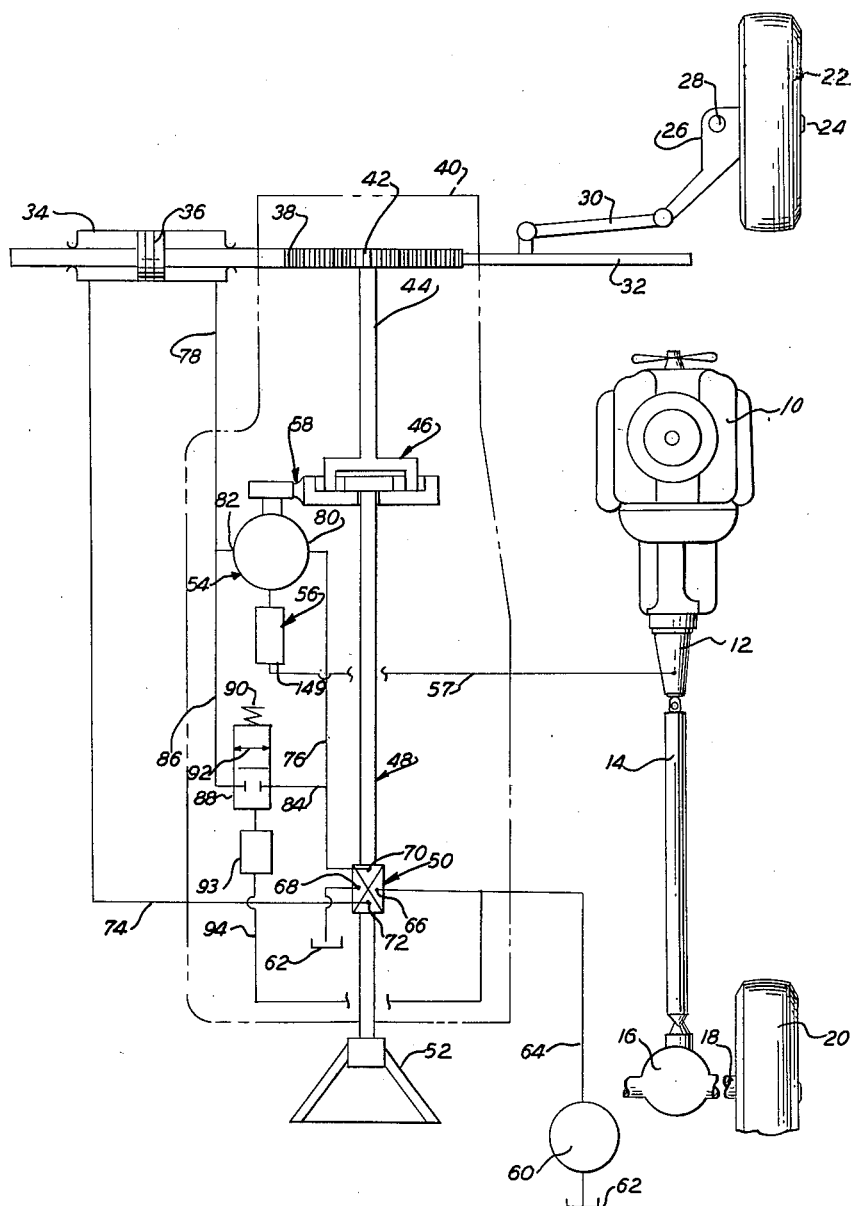
FIGURE 1 is a schematic diagram of a power steering system incorporating the present invention.

Referring now to FIGURE 1, there is schematically shown a motor vehicle engine 10 having an automatic transmission 12 attached thereto. The automatic transmission 12 is coupled through a drive shaft 14, a differential 16, and a rear axle 18 to a rear driving wheel 20. Transmission 12 includes the usual rear pump which produces a pressure that is substantially a direct function of vehicle speed.

The front dirigible wheel 22 of the vehicle is supported on a spindle 24 carried by a knuckle arm 26 which is pivotally mounted on the usual kingpin 28. The steering knuckle 26 is connected by tie rod 30 to a transverse linkage member 32, which is shiftable both manually and by hydraulic power as will be hereinafter described.

A power fluid motor comprising a hydraulic cylinder 34 is anchored to the vehicle frame and has a piston 36 slidably mounted therein. Piston 36 is coupled to the transverse linkage member 32. The linkage member 32 includes intermediate its ends a gear rack 38 which is located within a housing member 40 indicated schematically in FIGURE 1 by the dotted outline. Also contained in the housing 40 is a pinion gear 42 which engages the rack 38. Additionally included in the housing 40 are an output shaft 44, a planetary gear set generally designated 46, an input shaft generally designated 48, and a servo valve generally designated 50, all of which are disposed along the path of power transmission from a steering wheel 52 to the dirigible wheel 24.

The housing 40 also includes a variable displacement fluid motor generally designated 54, having its displacement per revolution controlled by a hydraulic stroke motor generally designated 56. Stroke motor 56 is supplied with pressure fluid through a conduit 57 which is connected to the outlet of the rear pump of transmission 12. As previously noted, the transmission rear pump will produce a pressure which is substantially proportional to the speed of the vehicle. Motor 54 has its mechanical output connected to an irreversible worm and wheel drive generally designated 58, the ring gear of the planetary set 46 forming the wheel of the worm and wheel gear set.

The system includes a power steering pump 60 driven by the vehicle engine and which receives fluid from a reservoir 62 and delivers it at an increased pressure and a relatively constant flow rate to a conduit 64 which leads to the inlet port 66 of the steering servo valve 50. Valve 50 is of the conventional open-center type and includes a tank port 68 and a pair of motor ports 70 and 72. The motor port 72 of valve 50 communicates directly with one end of the power cylinder 34 through a conduit 74. The other motor port 70 of valve 50 communicates with the opposite end of cylinder 34 through conduits 76 and 78 which have interposed therebetween the variable displacement motor 54. Conduit 76 connects to a working port 80 of motor 54 and conduit 78 connects to a working port 82 of motor 54.

A by-pass path around the motor 54 is formed by a pair of conduits 84 and 86 which have a by-pass control valve 88 interposed therebetween. The valve 88 is schematically shown in FIGURE 1 and is normally spring offset by the compression spring 90 in a direction such as to effect communication between conduits 84 and 86, as indicated by the arrow 92. Valve 88 is provided with a hydraulic actuator 93 which acts in opposition to the spring 90 to urge the valve to the position illustrated, in which the conduits 84 and 86 are isolated from each other. The hydraulic actuator 93 for valve 88 is supplied with pressure fluid by a conduit 94 which leads from the conduit 64 connecting, as previously noted, between the pump 60 and the open-center control valve 50. The spring 90 and hydraulic actuator 93 are so selected that the pressure in conduit 64 will maintain the valve 88 in the blocking position illustrated as long as the pump 60 is delivering the minimum flow rate necessary for proper operation of the steering system. Should the delivery of pump 60 drop below the required minimum then the pressure in conduit 64 and hence in the hydraulic actuator 93 will be insufficient to overcome the spring 90 and the valve 88 will be shifted by spring 90 to the position connecting conduits 84 and 86, thus by-passing the motor 54 so as to permit manual steering.

Figure 3:
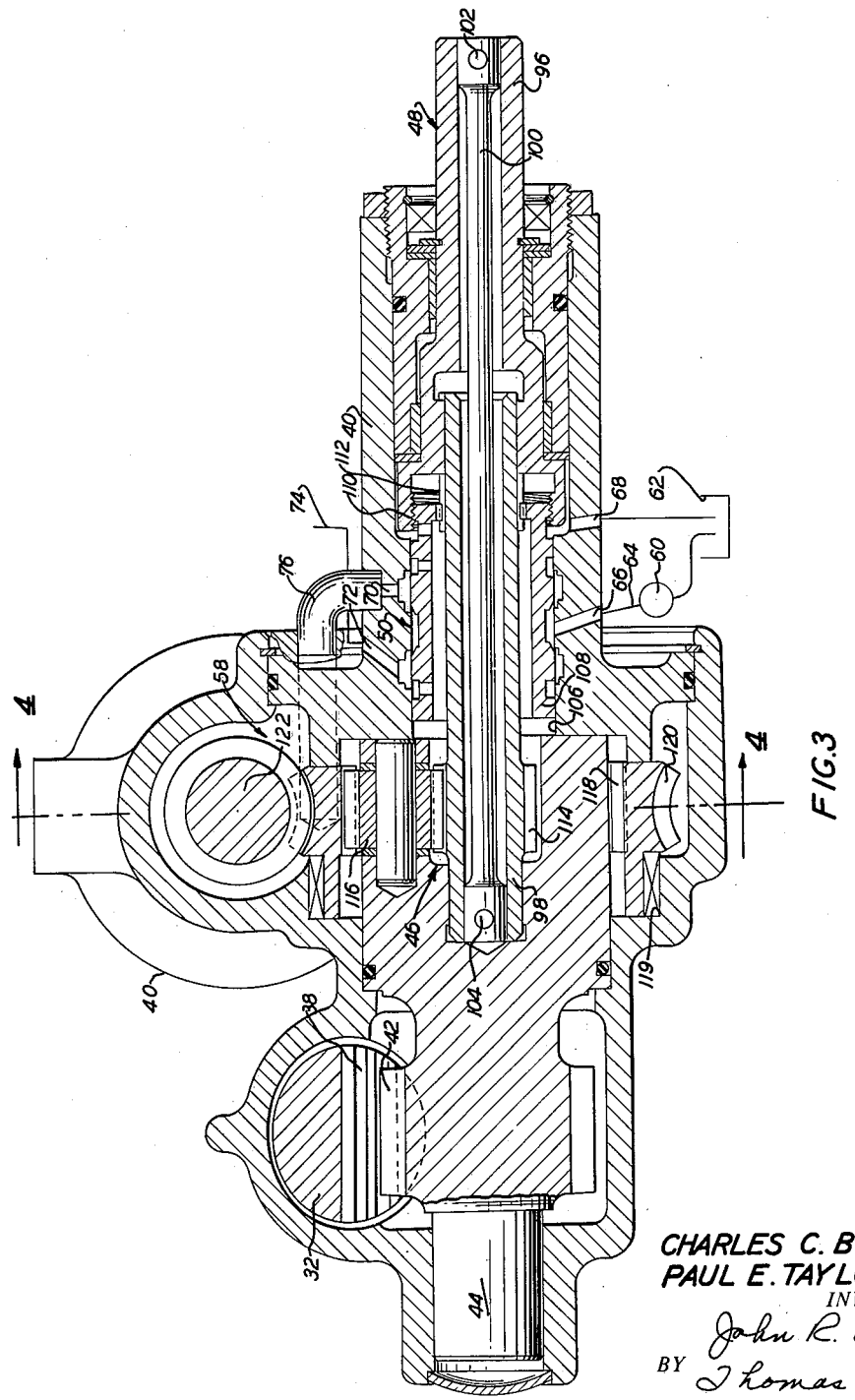
FIGURE 3 is a longitudinal sectional view taken through a preferred embodiment of part of the mechanism shown schematically in FIGURE 1.

Referring now to FIGURE 3, the input shaft generally designated 48 includes a first shaft 96 and a second shaft 98 which are capable of limited relative rotation, and are connected by a torsion bar member 100 which is pinned to the first shaft member 96 at 102 and to the second shaft member 98 at 104. The servo valve generally designated 50 includes a valve bore 106 which is concentric with the shafts 96 and 98 and contains an axially slidable valve spool 108. The valve spool 108 is connected to the first shaft 96 through screw threads 110 and is connected to the second shaft 98 by a splined connection 112. It will be apparent that in transmitting torque from shaft 96 to shaft 98, the member 100 will torsionally deflect. This deflection results in relative rotation between shafts 96 and 98. Such relative rotation causes axial movement of the valve spool 108, since the spool 108 is restrained against all but axial movement on the shaft 98 by the spline 112, and such axial movement will be induced by the threaded connection 110 between spool 108 and the first shaft 96.

Figure 4:
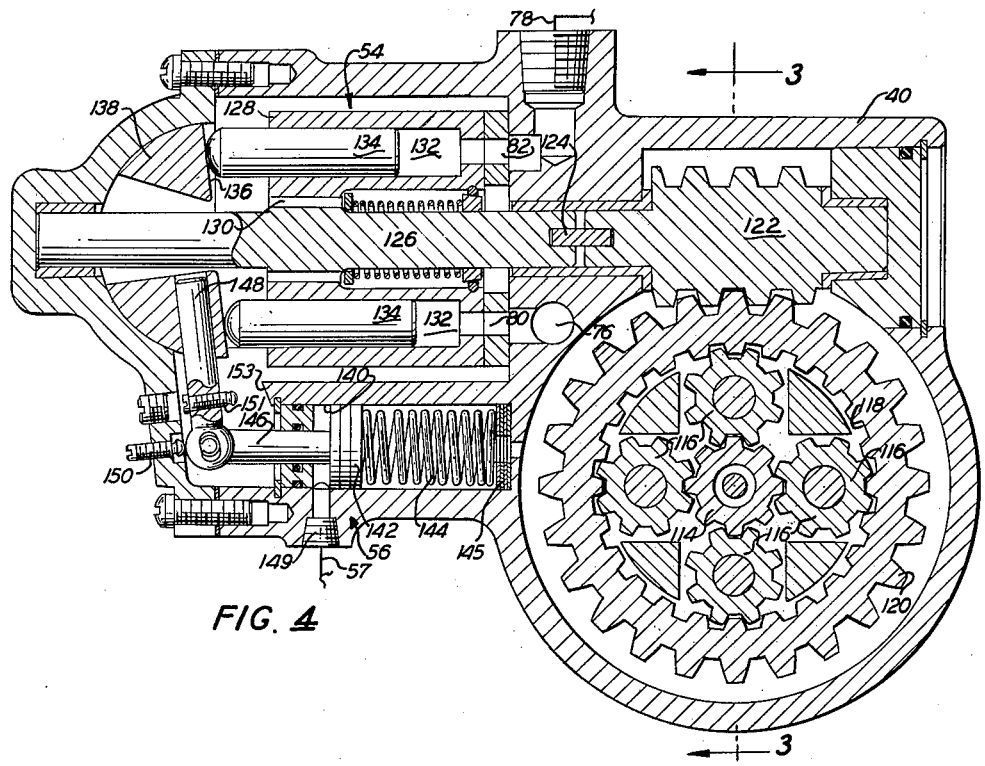
FIGURE 4 is a section taken on line 4—4 of FIGURE 3.

The valve bore 106 is supplied with high pressure fluid at its port 66, and low pressure fluid is returned to the reservoir 62 through the port 68. In the centered position in which spool 108 is illustrated, fluid from the pressure port 66 will flow across the motor ports 70 and 72, resulting in equal pressures in each of those ports, and thence back to the reservoir 62. If the valve spool 108 is shifted rightwardly, as viewed in FIGURE 3, it will be seen that pressure will increase in port 70 and decrease in port 72, and vice-versa. This is conventional "open-center" valving and need not be described in any further detail. As previously noted in connection with the discussion of FIGURE 1, the motor port 72 is connected directly to one end of the motor 34 through a conduit 74, and the motor port 70 connects through a conduit 76 with the working port 80 of the variable fluid motor 54 (see FIGURE 4). Referring further to FIGURE 4, it will be seen that the working port 82 of motor 54 communicates with a conduit 78 which, as shown in FIGURE 1, leads to the other end of the motor 34.

The second shaft 98 of the input shaft 48 carries adjacent its inner end the sun gear 114 of the planetary gear set 46. Output shaft 44 is concentrically disposed with respect to the input shaft 48 and carries at its inner end a plurality of planet gears 116 which engage both the sun gear 114 and an internally toothed ring gear 118 supported in bearings 119. The ring gear 118 is also toothed on its outer periphery at 120 so as to form with the worm gear 122 the worm and wheel gear set generally designated 58. Adjacent its outer end the output shaft 44 carries the pinion gear 42 which engages the rack 38 carried by the output member 32, as previously noted in connection with the discussion of FIGURE 1.

Referring now to FIGURE 4, it will be seen that the worm gear 122 is rotatably journalled in the housing 40 and is coupled by a key 124 to the shaft 126 of the fluid motor generally designated 54. The motor 54 includes a cylinder barrel 128 which is splined at 130 to the driveshaft 126 and includes a plurality of cylinder bores 132 each having a piston 134 reciprocable therein. The pistons 134 extend from the cylinder barrel 128 to contact the face 136 of a swash plate 138 which is tiltably mounted in the housing. It will be apparent that the excursion of each piston during a revolution of the cylinder barrel 128 will be established by the angle between the face 136 and the axis of cylinder barrel 128. The means provided for controlling the displacement per revolution of the motor 54, comprises the mechanism generally designated 56, which includes a cylinder 140 having a piston 142 slidably mounted therein and biased to the position illustrated by a spring 144. Spring 144 is adjustable by shims 145. The piston 142 is connected by a rod 146 and a pin 148 with the swash plate 138. The operation of the control mechanism 56 is such that, until the pressure applied to port 149 exceeds a predetermined amount, the spring 144 will maintain the motor 54 in a minimum displacement position which is established by abutment between the pin 148 and the adjustable stop member 150. As the pressure in port 149 increases beyond said predetermined minimum, the control piston 148 will be shifted rightwardly against the force of spring 144, and the swash plate 138 will be pivoted so as to increase the displacement of fluid motor 54, until the adjustable stop 151 contacts the abutment 153 on housing 40.

The fluid motor 54 is generally conventional in nature. When fluid is supplied to port 82, rotation will be opposite in direction to that resulting when fluid is supplied to port 80. Further, assuring a constant supply rate, the speed of rotation will vary inversely with the per-revolution displacement.

In operation, with the engine 10 running and the vehicle stationary, no pressure will be developed by the rear transmission pump and hence the motor 54 will be in its minimum displacement position, wherein the spring 144 biases the pin 148 against the adjustable stop 150. When the steering wheel 52 is turned, the valve 108 will be shifted so as to divert fluid to one of the ports 72 or 70 thus producing a force in the power cylinder 34 which shifts the piston 36 and turns the dirigible wheel 22. If the wheel 22 is moved so as to produce a left turn as viewed in FIGURE 1, fluid pressure will be ported from the motor port 72 to the left hand end of cylinder 34 resulting in a rightward movement of cross frame member 32 and hence left hand turning movement of dirigible wheel 22. The fluid discharged from the right hand end of cylinder 34 will pass through the conduit 78 into the working port 82 of motor 54 at the same rate fluid is supplied to the left hand end of cylinder 34, thus rotating motor 54 in the direction of rotation of input shaft 48 at a relatively high speed, due to the small displacement setting of the motor. The resulting low steering ratio makes parking easy and rapid, requiring a small number of steering wheel turns to move the dirigible wheel 22 from stop to stop. When the input shaft is rotated in the opposite direction, to produce right-turn motion of the dirigible wheel, fluid from pump 60 will pass through motor 54 from port 80 to port 82, driving the motor in the opposite direction at the same high speed, thus producing the same low steering ratio in both directions of operation.

The low overall steering ratio of the stationary vehicle is retained at all vehicle speeds up to 10 miles an hour, since the spring 144 and the area of the piston 142 are so selected that the pressure developed by the rear transmission pump is insufficient to produce increased displacement of variable motor 54 at speeds below 10 miles per hour. This arrangement insures that a desirably low steering ratio is available for slow speed maneuvering.

As the vehicle speed exceeds 10 miles per hour the pressure developed by the rear transmission pump becomes adequate to shift the piston 142 against the spring 144 thus increasing the displacement of the variable motor 54 as a function of vehicle speed in excess of 10 miles per hour. The resulting increase in displacement causes motor 54 to rotate more slowly while being driven by fluid flowing to or from the cylinder 34, thus increasing the overall steering ratio. With each incremental increase in vehicle speed there is a corresponding incremental increase in overall steering ratio. This gradual increase in steering ratio will continue, as a function of vehicle miles per hour, up to a preselected maximum at a speed of say, 50 miles per hour, when the adjustable stop 151 contacts the housing at 153. As the vehicle speed is increased beyond 50 miles per hour, the maximum overall steering ratio remains unaffected, since the motor 54 is biased to its maximum displacement position at the speed of 50 miles per hour.

The worm and wheel gear set 58 is of the irreversible type, that is, the wheel 120 cannot drive the worm 122. Thus, in the case of a hydraulic power failure, the variable motor 54 will be by-passed by the valve 88 as previously noted, and the ring gear 118 will become stationary, thus causing the planetary set to "fail safe," that is, revert to a conventional reduction gearing having a higher reduction ratio than during power operation when the ring gear is driven.

It has been established by experiment that a generally desirable range of ratios during power operation would be from 12:1 at speeds below 10 miles per hour up to a maximum of 28:1 at 50 miles per hour. These figures indicate orders of magnitude only, and other ratios are entirely feasible.

Figure 2:
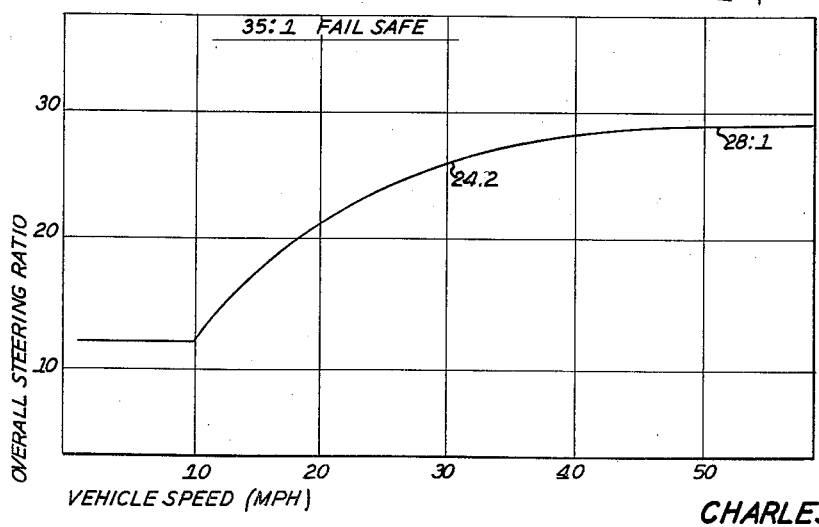
FIGURE 2 is a curve in which the overall steering ratio of a system incorporating the present invention is plotted against vehicle speed.

In a particular system design embodying the present invention, a planetary gear set 46 was selected having a 4:1 reduction when the ring gear 118 was held stationary. The rack 38 and pinion 42 and the other steering linkages were so selected that they cooperated with the 4:1 planetary gear set to give an overall steering ratio of 35:1 with the ring gear of the planetary set held stationary. The fluid motor 54 was adjusted to have its minimum displacement such that the full delivery of pump 60 passing therethrough would drive ring gear 118 in the direction of input shaft 48 at a relatively high speed such as to produce an overall steering ratio of 12:1. The maximum displacement of motor 54 was so established that full delivery of pump 60 passing therethrough would drive ring gear 118 at a relatively low speed in the direction of rotation of shaft 48, so as to produce an overall steering ratio of 28:1. The preload of spring 144 was so adjusted by use of shims 145, that increase in displacement of motor 54 was initiated at 10 miles per hour. The rate of spring 144 was selected to be such that the increase in rear pump pressure from 10 miles per hour to 50 miles per hour was just sufficient to induce full motor dipslacement increase. The curve of FIGURE 2 is a plot of the overall steering ratio versus vehicle speed in miles per hour for this particular design.

It will be seen that adjustment of abutments 150 and 151 will adjust the low and high overall power steering ratios, respectively, and that adjustment of shims 145 permit selection of the vehicle speed at which ratio increase is initiated. It is thus a simple matter to tailor the steering characteristics of a particular vehicle to the preferences of the driver.

It will be apparent from the foregoing that the present invention has provided an improved power steering gear having an overall steering ratio which is varied as a function of vehicle speed, and which is constructed of mechanical and hydraulic components which are low in cost, reliable, and thoroughly proven.

While the form of embodiment of the invention as herein disclosed constitutes a preferred form, it is to be understood that other forms might be adopted, all coming within the scope of the claims which follow.

What is claimed is as follows:

1. In a power steering system for a vehicle having a steering member and dirigible wheel which are operatively coupled, the combination of: a variable ratio positioning mechanism interposed in the coupling between said member and wheel; and means responsive to the speed of said vehicle for varying the effective ratio of said mechanism as a function of vehicle speed.

2. The structure defined by claim 1 which is further characterized in that said positioning mechanism comprises a planetary gear set, and said means includes a power device for driving one gear of said planetary set at a speed which is a function of the speed of said vehicle.

3. The structure defined by claim 2 which is further characterized in that said one gear comprises the ring gear of the planetary set.

4. The structure defined by claim 2 which is further characterized in that said power device is of the irreversible type.

5. The structure defined by claim 2 which is further characterized in that said power device drives said one gear in a direction dependent on the direction of steering.

6. In a power steering system for a vehicle having a steering member and a dirigible wheel which are operatively coupled, the combination of: a variable ratio positioning mechanism interposed in the coupling between said member and wheel; a variable displacement, rotary, control fluid motor connected to said mechanism to vary the effective ratio thereof as a function of fluid motor speed; means for varying the displacement of said motor as a function of the speed of said vehicle; and means for passing fluid through said motor at a rate dependent on the turning rate of said dirigible wheel, and in a direction dependent on the direction of turning of said dirigible wheel.

7. The structure defined by claim 6 which is further characterized in that said last mentioned means includes an expansible chamber fluid motor mechanically coupled to said wheel, and hydraulically in series with said variable displacement motor.

8. The structure defined by claim 6 which is further characterized in that the connection between said first named fluid motor and said device is an irreversible one.

9. The structure defined by claim 6 which is further characterized in that said first named means comprises a source of fluid pressure varying in magnitude as a function of vehicle speed, a control piston, resilient means biasing the control piston, and means for applying said pressure to said control piston.

10. The structure defined by claim 9 which is further characterized in that said source of fluid pressure comprises the rear pump of the vehicle automatic transmission.

11. The structure defined by claim 9 which is further characterized in that said resilient means are adjustable in biasing force.

12. In a power steering system for a vehicle having a steering member and a dirigible wheel which are operatively coupled, the combination of: a variable ratio positioning mechanism interposed in the coupling between said member and wheel; a variable displacement, rotary, control fluid motor connected to said mechanism to vary the effective ratio thereof as a function of motor speed; means for varying the displacement of said motor as a function of the speed of said vehicle; a power fluid motor connected to said dirigible wheel; a servo valve for activating said power fluid motor; a source of fluid pressure for supplying said servo valve; and fluid conduit means extending between said servo valve and said power fluid motor, said control motor being interposed in series therein.

13. In a power steering system for a vehicle having a steering member and dirigible wheel which are operatively coupled, the combination of: a variable ratio positioning mechanism interposed in the coupling between said member and wheel; a variable displacement, rotary, control fluid motor connected to said mechanism to vary the effective ratio thereof as a function of motor speed; means for varying the displacement of said motor as a function of the speed of said vehicle; a power fluid motor connected to said dirigible wheel; a servo valve for activating said power fluid motor; a source of fluid pressure for supplying said servo valve; fluid conduit means extending between said servo valve and said power fluid motor, said control fluid motor being interposed in series therein; a by-pass passage in parallel with said control motor; and valve means responsive to failure of said fluid pressure source to open said by-pass.

14. The structure defined by claim 13 which is further characterized in that said valve means is hydraulically operated and is normally maintained in the closed position by pressure existing between said source and said servo valve.

15. An article of manufacture comprising: a housing; coaxially disposed input and output shafts rotatably mounted in said housing; a planetary gear set including a sun gear on said input shaft, a planet gear on said output shaft, and a ring gear rotatably mounted in said housing; external teeth on said ring gear; a worm gear in said housing engaging said external teeth, and having its axis perpendicularly offset with respect to the axes of said input and output shafts; and a fluid motor in said housing having its output shaft coaxial with, and coupled to, said worm gear for driving the ring gear of said planetary gear set.

16. The structure defined by claim 15 which is further characterized in that said fluid motor is of the variable displacement type, and includes a control port for external control of displacement variation.

17. An article of manufacture comprising: a housing; coaxially disposed input and output shafts rotatably mounted in said housing; means forming a lost motion coupling between said input and output shafts; a servo valve in said housing having a motor port and being operable by lost motion in said coupling; a planetary gear set including a sun gear on said input shaft, a planet gear on said output shaft, and a ring gear rotatably mounted in said housing; external teeth on said ring gear; a worm gear in said housing engaging said external teeth, and having its axis perpendicularly offset with respect to the axes of said input and output shafts; a fluid motor in said housing having its output shaft coaxial with, and coupled to, said worm gear, said motor having a working port; and means establishing fluid communication between said motor port and said working port whereby said fluid motor drives said ring gear.

18. In a power steering system for a vehicle having a steering member and a dirigible wheel which are operatively coupled, the combination of: a variable ratio positioning mechanism interposed in the coupling between said member and wheel; a variable displacement, rotary, control fluid motor connected to said mechanism to vary the effective ratio thereof as a function of fluid motor speed; positive stop means for limiting the minimum and maximum motor displacement; means for varying the displacement of said motor as a function of the speed of said vehicle; and means for passing fluid through said motor at a rate dependent on the turning rate of said dirigible wheel, and in a direction dependent on the direction of turning of said dirigible wheel.

19. The structure defined by claim 18 which is further characterized in that said positive stop means are adjustable to permit adjustment of the minimum and maximum motor displacements.

20. A power steering system for an automotive vehicle comprising a steering member, a dirigible wheel operatively coupled to said steering member, and means interposed between said steering member and said dirigible wheel and responsive to the speed of the vehicle for varying the effective steering ratio of the system as a function of vehicle speed.

21. A power steering system for an automobile vehicle comprising a steering member, a dirigible wheel operatively coupled to said steering member, and means interposed between said steering member and said dirigible wheel and responsive to the speed of the vehicle for varying the effective steering ratio of the system as a function of vehicle speed, said means including a variable ratio positioning mechanism.

22. A power steering system for an automotive vehicle comprising a steering member, a dirigible wheel operatively coupled to said steering member, and means interposed between said steering member and said dirigible wheel and responsive to vehicle speed for varying the ratio of the number of turns of said steering member to the number of turns of said dirigible wheel as a function of vehicle speed.

23. A power steering system for an automotive vehicle comprising a steering member, a dirigible wheel operatively coupled to said steering member, and means interposed between said steering member and said dirigible wheel and responsive to vehicle speed for increasing the ratio of the number of turns of said steering member to the number of turns of said dirigible wheel as the speed of the vehicle increases.

References Cited in the file of this patent

UNITED STATES PATENTS

| | | |
|---|---|---|
| 2,072,203 | Fuller | Mar. 2, 1937 |
| 2,105,473 | Dean | Jan. 18, 1938 |
| 2,487,618 | Twyman | Nov. 8, 1949 |
| 2,760,590 | Stolte | Aug. 28, 1956 |
| 2,788,671 | Talbot | Apr. 16, 1957 |
| 2,791,287 | Stolte | May 7, 1957 |
| 2,796,945 | Dye et al. | June 25, 1957 |
| 2,957,535 | Helgeson | Oct. 25, 1960 |

FOREIGN PATENTS

| | | |
|---|---|---|
| 554,310 | Canada | Mar. 11, 1958 |
| 759,163 | Great Britain | Oct. 17, 1956 |